United States Patent
Butcher et al.

(10) Patent No.: US 10,029,801 B2
(45) Date of Patent: Jul. 24, 2018

(54) AFT ENGINE MOUNTING LINK ROTATIONAL STOP COLLAR

(71) Applicant: THE BOEING COMPANY, Chicago, IL (US)

(72) Inventors: Michael R. Butcher, Issaquah, WA (US); Adrian Stanescu, Maple Valley, WA (US)

(73) Assignee: THE BOEING COMPANY, Chicago, IL (US)

( * ) Notice: Subject to any disclaimer, the term of this patent is extended or adjusted under 35 U.S.C. 154(b) by 285 days.

(21) Appl. No.: 14/828,145

(22) Filed: Aug. 17, 2015

(65) Prior Publication Data

US 2017/0050738 A1 Feb. 23, 2017

(51) Int. Cl.
| | | |
|---|---|---|
| *B64D 27/00* | (2006.01) | |
| *B64D 27/12* | (2006.01) | |
| *B64D 27/26* | (2006.01) | |
| *F02C 7/20* | (2006.01) | |

(52) U.S. Cl.
CPC ............ *B64D 27/12* (2013.01); *B64D 27/26* (2013.01); *F02C 7/20* (2013.01); *B64D 2027/266* (2013.01)

(58) Field of Classification Search
CPC ........... F02C 7/20; B64D 27/26; B64D 27/12; B64D 2027/262; B64D 27/18
See application file for complete search history.

(56) References Cited

U.S. PATENT DOCUMENTS

| | | | | | |
|---|---|---|---|---|---|
| 4,372,517 | A * | 2/1983 | Welch | ................... | F02F 7/0068 248/221.12 |
| 4,742,975 | A * | 5/1988 | Pachomoff | ............. | B64D 27/26 244/54 |
| 5,238,206 | A * | 8/1993 | Pachomoff | ............. | B64D 27/18 244/54 |
| 5,275,357 | A * | 1/1994 | Seelen | ................... | B64D 27/26 244/54 |
| 5,303,880 | A * | 4/1994 | Cencula | ................. | B64D 27/26 244/54 |
| 5,351,930 | A * | 10/1994 | Gwinn | ................... | B64D 27/26 244/54 |
| 6,341,746 | B1 * | 1/2002 | Pascal | .................... | B64D 27/26 244/54 |
| 2007/0138337 | A1 * | 6/2007 | Audart-Noel | .......... | B64D 27/26 244/53 R |
| 2009/0236469 | A1 * | 9/2009 | Suciu | ..................... | B64D 27/26 244/54 |
| 2010/0147997 | A1 * | 6/2010 | Martinou | ............... | B64D 27/26 244/54 |
| 2010/0181419 | A1 * | 7/2010 | Haramburu | ............ | B64D 27/26 244/54 |

(Continued)

*Primary Examiner* — Assres H Woldemaryam
(74) *Attorney, Agent, or Firm* — Patterson + Sheridan, LLP

(57) ABSTRACT

A method and apparatus for suspending a load is provided. A load is connected to a yoke by one or more mounting links. The mounting links are connected to the yoke by a yoke pins and to the load by load mounting pins. The mounting links are connected to the pins by spherical bearings that enable the mounting links to move relative to yoke and to the load to accommodate movement of the load, such as movement caused by thermal expansion of the load. A stop collar is arranged around the load mounting pins to limit free movement of the mounting links about a longitudinal axis so that the mounting links cannot contact the load.

16 Claims, 11 Drawing Sheets

(56) References Cited

U.S. PATENT DOCUMENTS

| | | | |
|---|---|---|---|
| 2010/0320315 A1* | 12/2010 | Kashiwagi | B64D 45/02 244/1 A |
| 2011/0108328 A1* | 5/2011 | Wilde | B22D 19/06 175/320 |
| 2014/0061426 A1* | 3/2014 | Zheng | B64D 27/26 248/554 |
| 2015/0069176 A1* | 3/2015 | Stretton | B64D 27/26 244/54 |
| 2015/0197341 A1* | 7/2015 | Ewens | B64D 27/26 244/54 |
| 2015/0298819 A1* | 10/2015 | Yamakoshi | B23P 11/00 244/1 A |
| 2015/0308290 A1* | 10/2015 | Kappes | F01D 25/24 415/119 |

\* cited by examiner

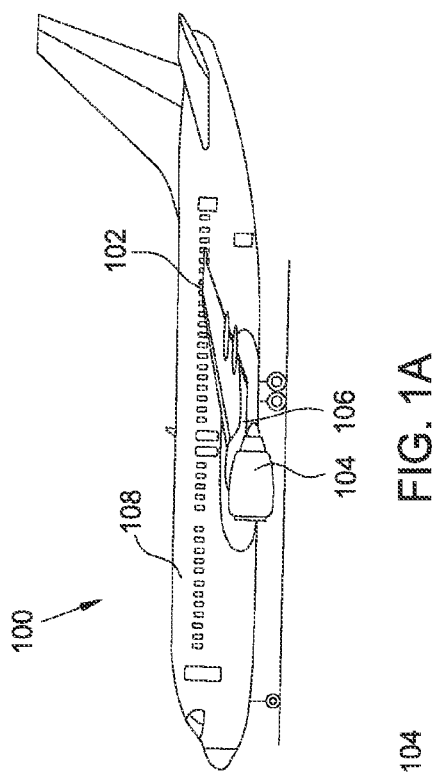
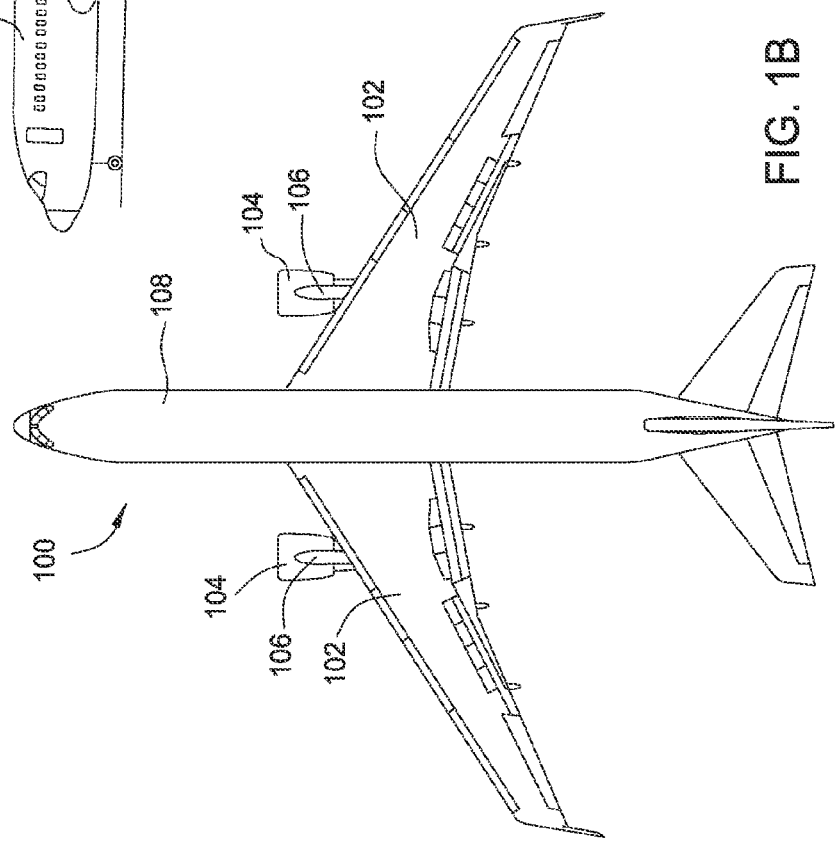
FIG. 1A
FIG. 1B

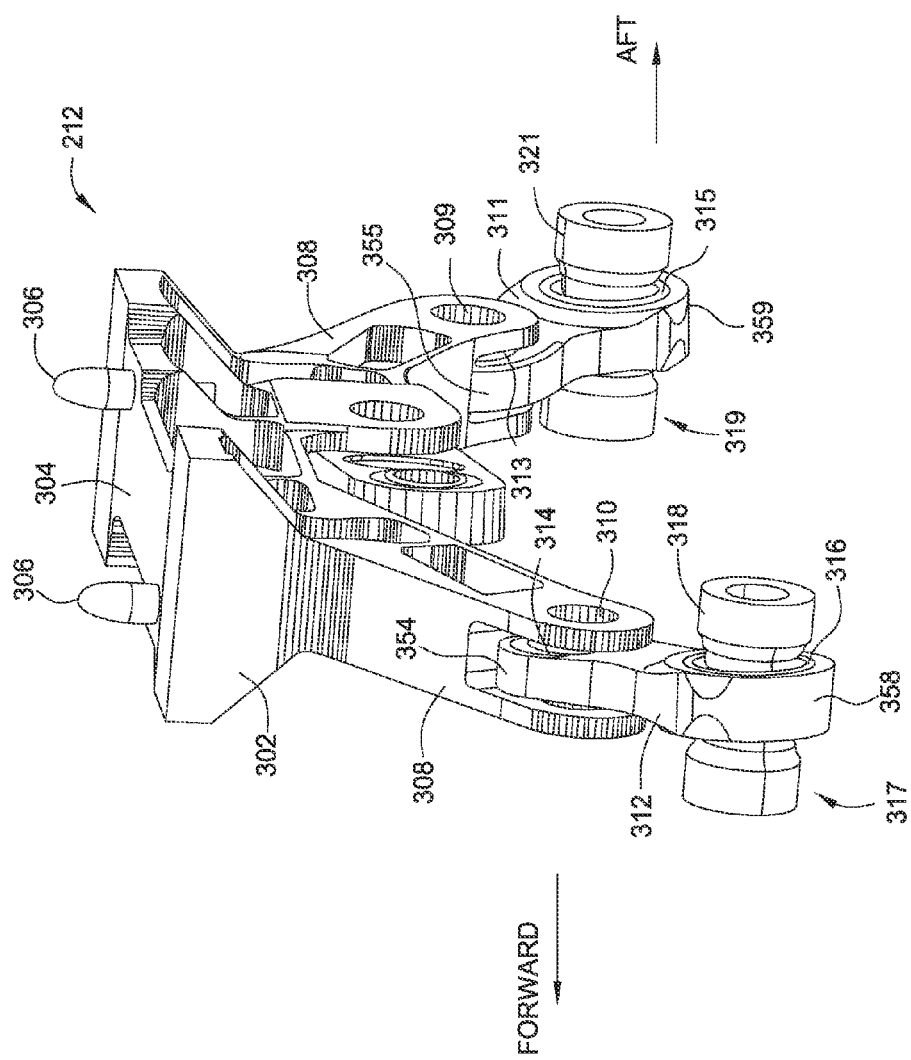

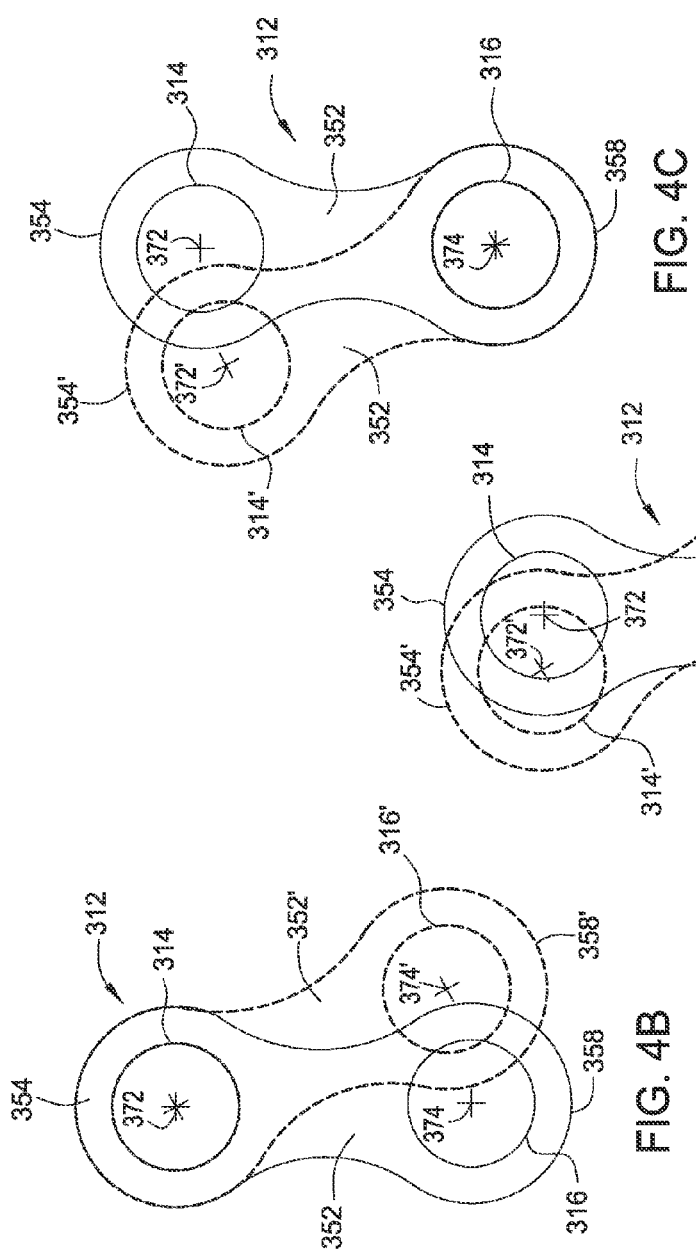

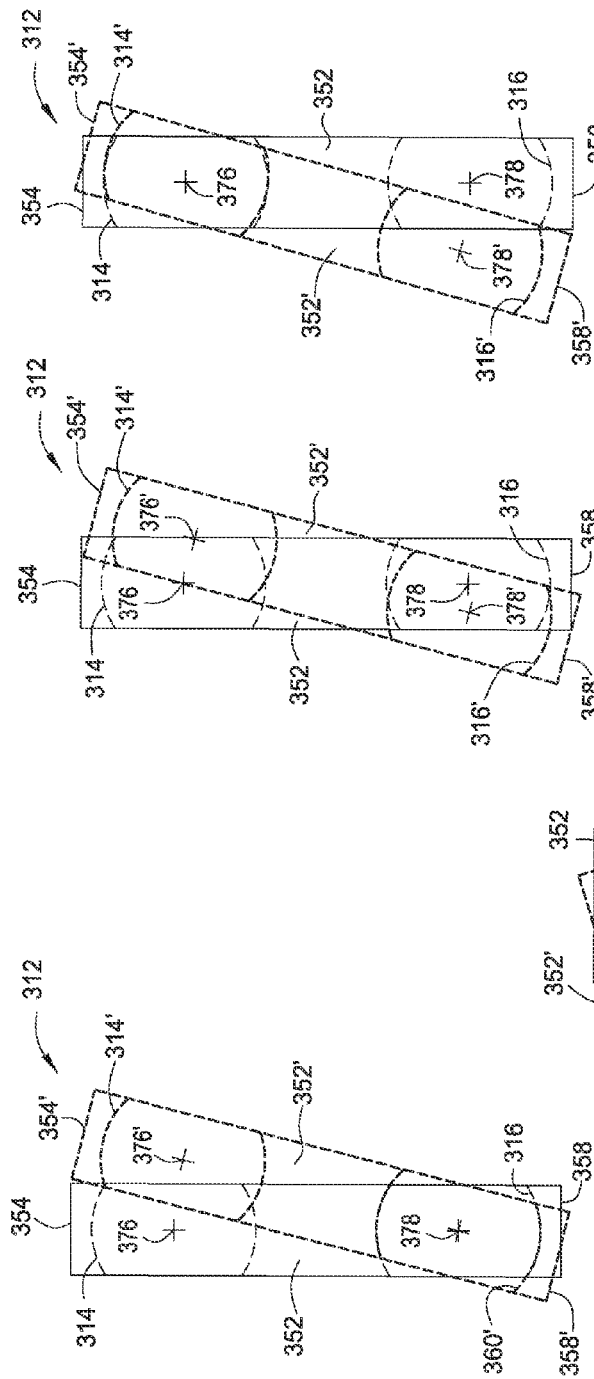
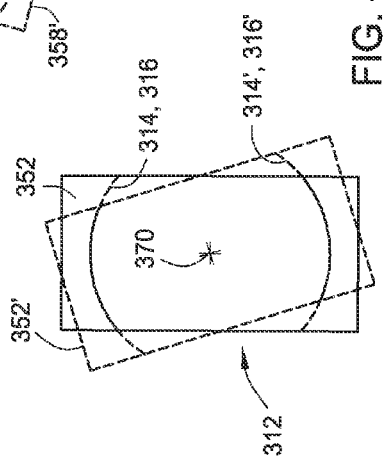

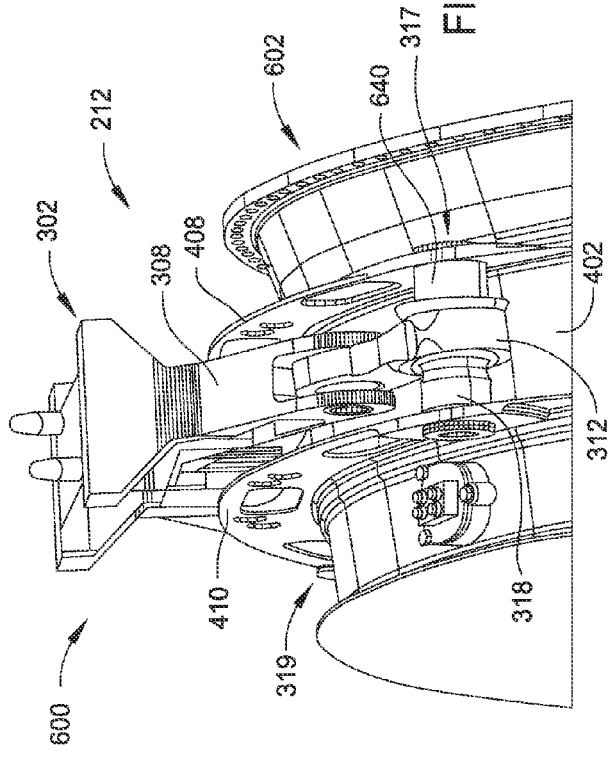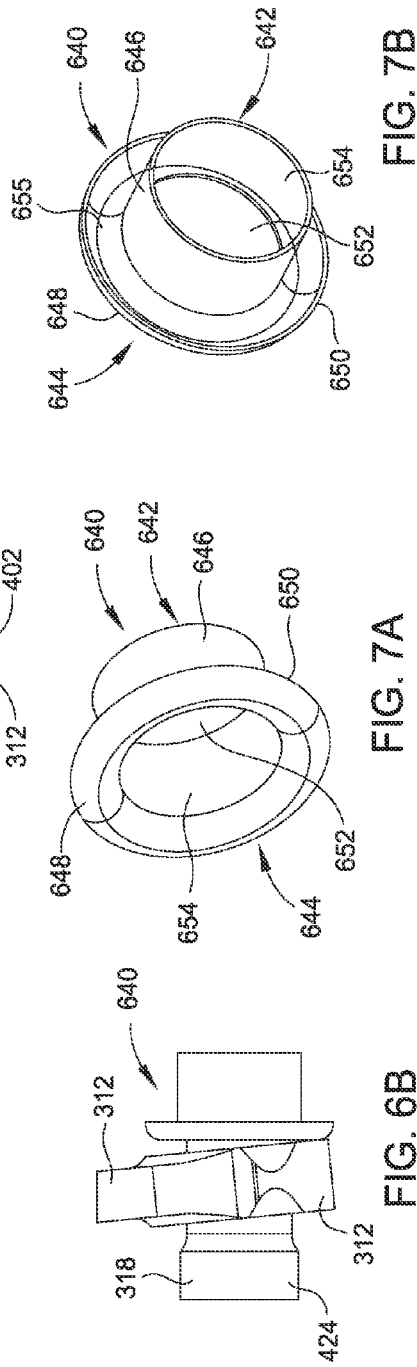

AFT ENGINE MOUNTING LINK ROTATIONAL STOP COLLAR

BACKGROUND

Aspects described herein relate to engine mounts, and more specifically, to engine mounts for a gas turbine engine to an aircraft.

SUMMARY

According to one aspect, an aircraft includes a wing. The wing includes an engine mounting structure. The aircraft also includes a yoke extending from the engine mounting structure. The yoke includes a yoke pin. The aircraft also includes an engine. The engine includes an engine mounting pin. The aircraft also includes an engine mounting link connected to the yoke pin by a first spherical bearing and connected to the engine mounting pin by a second spherical bearing. The engine mounting link can pivot about the first spherical bearing and the second spherical bearing to allow relative motion between the engine mounting pin and the yoke pin. The aircraft also includes a stop collar arranged around the engine mounting pin. The stop collar is adapted to contact the engine mounting link to limit rotation of the engine mounting link about a longitudinal axis through the first and second spherical bearings.

According to one aspect, a suspension system for suspending a load includes a yoke adapted to extend from a support. The yoke includes a yoke pin. The suspension system also includes a load mounting pin adapted to carry a load. The suspension system also includes a mounting link connected to the yoke pin by a first spherical bearing and connected to the load mounting pin by a second spherical bearing. The mounting link can pivot about the first spherical bearing and the second spherical bearing to allow relative motion between the load mounting pin and the yoke. The suspension system also includes a stop collar arranged around the load mounting pin. The stop collar is adapted to contact the mounting link to limit rotation of the mounting link about a longitudinal axis through the first and second spherical bearings.

According to one aspect, a method for mounting a load from a support includes attaching a yoke to the support. The yoke includes a yoke pin. The method also includes arranging a load relative to the yoke. The method also includes arranging a mounting link between the yoke and the load. The link includes a first spherical bearing arranged at a first end and a second spherical bearing arranged at a second end. The method also includes coupling the mounting link to the yoke by attaching the yoke pin to the yoke and to the first spherical bearing. The method also includes arranging a stop collar around a load mounting pin. The method also includes coupling the mounting link to the load by attaching the load mounting pin to the load and to the second spherical bearing. The mounting link can pivot about the first spherical bearing and the second spherical bearing to allow relative motion between the load mounting pin and the yoke. The stop collar is adapted to contact the mounting link to limit rotation of the mounting link about a longitudinal axis through the first and second spherical bearings.

BRIEF DESCRIPTION OF THE SEVERAL VIEWS OF THE DRAWINGS

FIG. 1A is a side view of an aircraft with under-wing mounted gas turbine engines;

FIG. 1B is a top view of the aircraft of FIG. 1A;

FIG. 3 is a perspective view of an aft mounting arrangement for a gas turbine engine that includes a yoke that connects to structure of a wing and engine mounting links that connect a gas turbine engine to the yoke;

FIG. 4B is a side view of the engine mounting link of FIG. 4A in a first position and a second position when rotated about a bearing axis through a first spherical bearing;

FIG. 4C is a side view of the engine mounting link of FIG. 4A in a first position and a second position when rotated about a bearing axis through a second spherical bearing;

FIG. 4D is a side view of the engine mounting link of FIG. 4A in a first position and a second position when rotated about a bearing axis through a first spherical bearing and a bearing axis through the second spherical bearing;

FIG. 4E is a top view of the engine mounting link of FIG. 4A in a first position and a second position when rotated about a normal axis through the second spherical bearing;

FIG. 4F is a top view of the engine mounting link of FIG. 4A in a first position and a second position when rotated about a normal axis through the first spherical bearing;

FIG. 4G is a top view of the engine mounting link of FIG. 4A in a first position and a second position when rotated about a normal axis through the first spherical bearing and a normal axis through the second spherical bearing;

FIG. 4H is an end view of the engine mounting link of FIG. 4A in a first position and a second position when rotated about a longitudinal axis through the first spherical bearing and the second spherical bearing;

FIG. 6A is a perspective view of an engine mounting arrangement in which an engine is connected to a yoke via engine mounting links, wherein an engine mounting pin includes a stop collar according to at least one aspect therearound;

FIG. 6B is a perspective view of the engine mounting pin, stop collar, and engine mounting link of FIG. 6A;

FIG. 7A is a perspective front view of the stop collar of FIG. 6A;

FIG. 7B is a perspective rear view of the stop collar of FIG. 6A;

DETAILED DESCRIPTION

Figure 2:
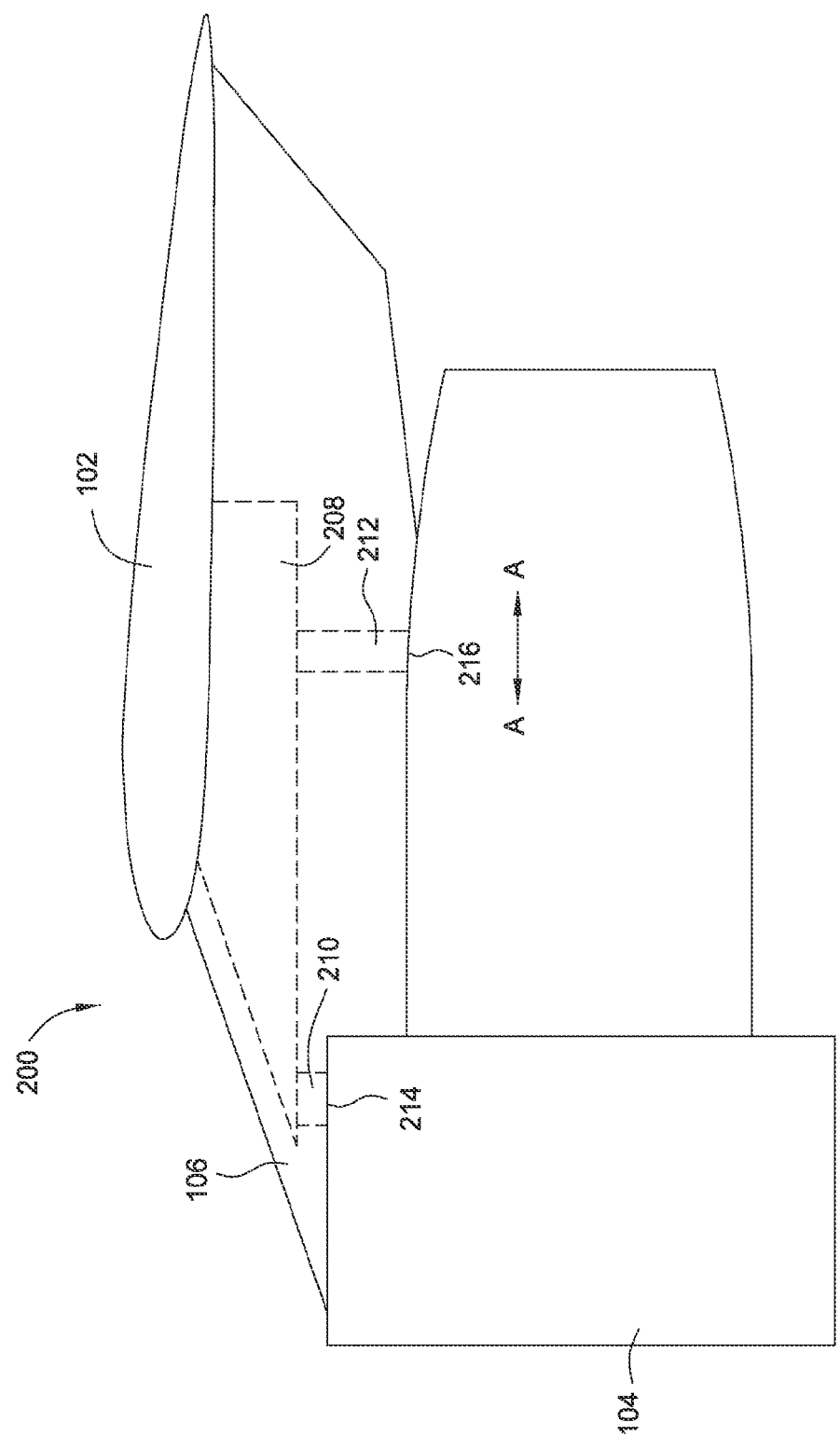
FIG. 2 is a schematic side view of a wing of an aircraft with a gas turbine engine mounted under the wing.

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects described herein provide a stop collar that can fit over an engine mounting pin supporting a gas turbine engine. The stop collar can prevent an engine mounting link from rotating about a spherical bearing on the engine mounting pin such that the link can contact a turbine exhaust case or other sensitive components of a gas turbine engine.

FIGS. 1A and 1B are a side view and a top view, respectively, of an aircraft 100. The aircraft 100 includes a fuselage 108 with wings 102 extending from the fuselage 108. Engines 104 are mounted under the wings from an aerodynamic pylon 106. In this particular illustration, the aircraft 100 is shown with two engines 104, one under each wing 102. In other configurations the aircraft 100 may include more than one engine under each wing.

FIG. 2 is a side view of the under-wing engine arrangement 200 shown in FIG. 1A. In the under-wing engine arrangement 200, the engine 104 is arranged below the wing 102. The wing 102 includes an engine mounting structure 208 inside of the aerodynamic pylon 106. The engine mounting structure 208 includes a forward engine mount 210 and an aft engine mount 212. The forward engine mount 210 is connected to a forward mounting point 214 on the engine 104. The aft engine mount 212 is connected to an aft mounting point 216 on the engine. The forward engine mount 210 is typically rigidly connected to the forward mounting point 214 of the engine 104, meaning that there is little to no movement between the forward engine mount 210 and the forward mounting point 214 on the engine 104. By contrast, the aft engine mount 212 is connected to the aft mounting point 216 of the engine 104 in a manner that allows for relative movement (indicated by arrow A) between the aft engine mount 212 and the aft mounting point 216. This relative movement accommodates thermal expansion of the engine (e.g., as the engine climbs to operating temperature and/or changes power settings) or other movement of the engine 104.

FIG. 3 illustrates the aft engine mount structure 212, according to at least one aspect, that connects the engine mounting structure 208 to the gas turbine engine 104. The aft engine mount structure 212 includes a yoke 302 with a top surface 304. The top surface 304 abuts the engine mount structure of the wing. The yoke 302 can include lugs 306 or the like extending from the top surface 304. The lugs 306 fit into orifices in the engine mount structure of the wing, thereby locating the yoke 302 in a desired position relative to the engine mount structure of the wing. The yoke 302 includes two yoke arms 308 extending outward and downward (i.e., away from the wing when mounted thereto). The ends of the yoke arms 308 include yoke pins 309 and 310. A first end 354 of an engine mounting link 312 is connected to the yoke pin 310 by a first spherical bearing 314 that enables the engine mounting link 312 to rotate about a longitudinal axis of the yoke pin 310 and also to pivot about other axes of the yoke pin 310, discussed in greater detail below. A third end 355 of an engine mounting link 311 is connected to the yoke pin 309 by a third spherical bearing 313 that enables the engine mounting link 313 to rotate about a longitudinal axis of the yoke pin 309 and also to pivot about other axes of the yoke pin 309, discussed in greater detail below. A second end 358 of the engine mounting link 312 includes a second spherical bearing 316. An engine mounting pin 318 is arranged through the second spherical bearing 316. A fourth end 359 of the engine mounting link 311 includes a fourth spherical bearing 315. An engine mounting pin 321 is arranged through the fourth spherical bearing 316. The first engine mount pin 318 is arranged to connect to an engine at a first location 317 and the second engine mounting pin 321 is arranged to connect to the engine at a second location 319. The second spherical bearings 316 enable the engine mounting links 312 to rotate about a longitudinal axis of the engine mounting pins 318 and to pivot about other axes of the engine mounting pins 318. Ends of the engine mounting pins 318 are adapted for connection to flanges or other mounting structures on the gas turbine engine. When the engine mounting pins 318 are connected to the flanges, the engine 104 is supported by the engine mounting pins 318 to hang beneath the aft engine mount structure 212.

Figure 4A:
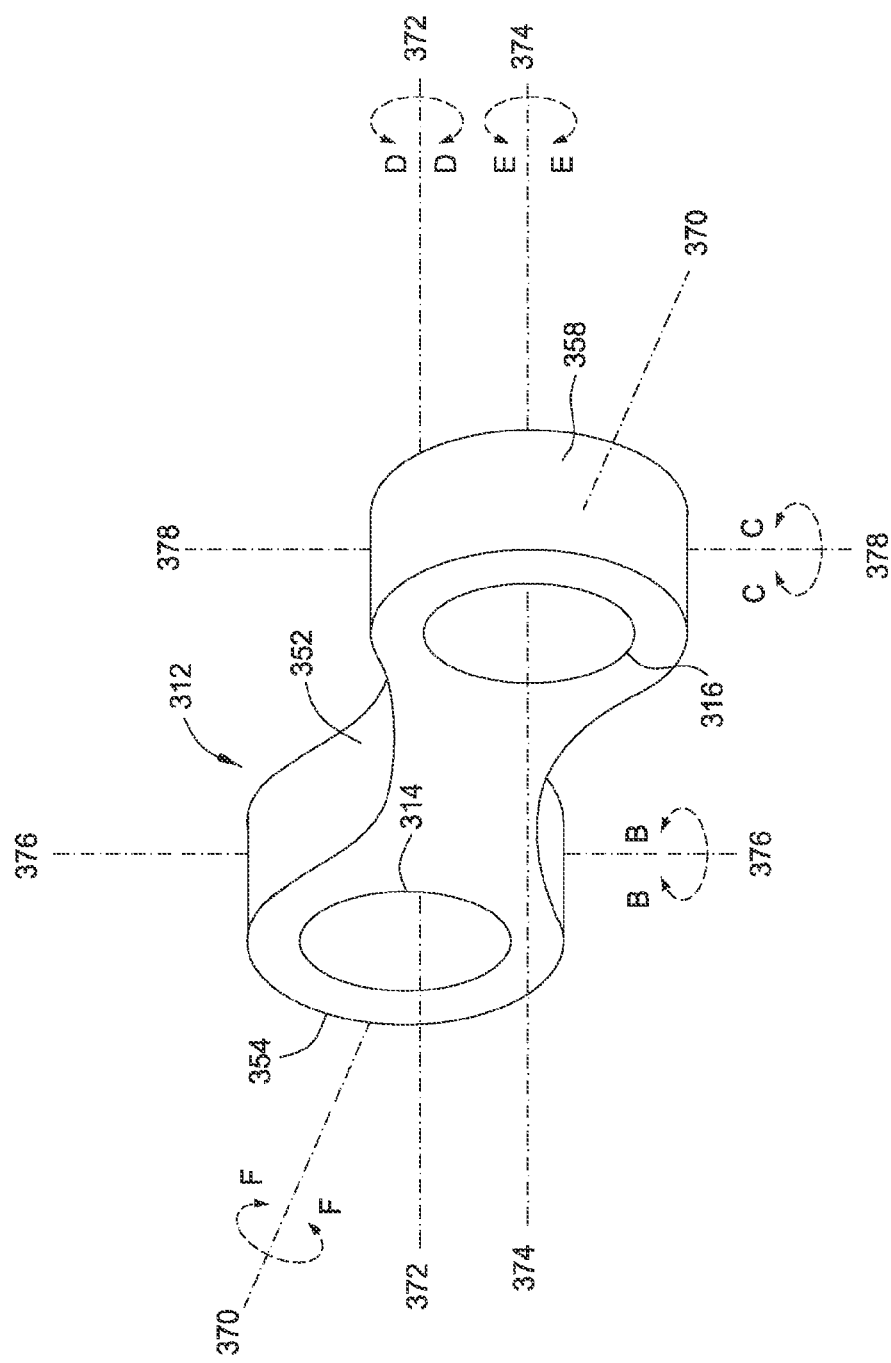
FIG. 4A is a perspective view of an engine mounting link and that illustrates various axes relative to the engine mounting link.

As discussed above, the spherical bearings in the engine mounting links allow the engine mounting links to rotate about the longitudinal axes of the yoke pins and engine mounting pins and to pivot about other axes of the yoke pins and engine mounting pins. FIG. 4A is a perspective view of the engine mounting link 312 and illustrates various axes about which the engine mounting link 312 can rotate and/or pivot. The engine mounting link 312 includes a body 352 with the first end 354 and the second end 358. The first spherical bearing 314 is arranged proximate to the first end 354 of the body 352 and the second spherical bearing 316 is arranged proximate to the second end 358 of the body 352. FIG. 4A illustrates a longitudinal axis 370 about which the engine mounting link 312 can rotate about the spherical bearings 314 and 316 in the direction of arrow F. FIG. 4A also illustrates bearing axes 372 and 374 through the spherical bearings 314 and 316 about which the engine mounting link 312 can rotate in the direction of arrow D and/or arrow E. FIG. 4A also illustrates normal axes 376 and 378, which are orthogonal to the longitudinal axis 370 and to the bearing axes 372 and 374. The engine mounting link 312 can rotate in the directions of arrow B and/or arrow C about the normal axes 376 and 378.

FIGS. 4B-4D are top views of the engine mounting link 312 (i.e., a view along the bearing axes 372 and 374 discussed above with reference to FIG. 4A). FIG. 4B illustrates a first position of the body 352 of the engine mounting link 312 in solid line and a second position of the body 352' of the engine mounting link 312 (shown in broken line) after the engine mounting link 312 has rotated about the bearing axis 372 through the first spherical bearing 314. As shown, the second end 358' of the body 352' and the second spherical bearing 316' have shifted while the first end 354 and the first spherical bearing 314 have rotated about the bearing axis 372 through the first spherical bearing 314. FIG. 4C illustrates the first position of the body 352 of the engine mounting link 312 in solid line and a second position of the body 352' of the engine mounting link 312 (shown in broken line) after the engine mounting link 312 has been rotated about the bearing axis 374 in the second spherical bearing 316. As shown, the first end 354' of the body 352' and the first spherical bearing 314' have shifted while the second end 358 and the second spherical bearing 316 have rotated about the bearing axis 374 through the second spherical bearing 316. FIG. 4D illustrates the first position of the body 352 of the engine mounting link 312 in solid line and a second position of the body 352' of the engine mounting link 312 (shown in broken line) after the engine mounting link 312 has been rotated about both the bearing axis 372 in the first spherical bearing 314' and the bearing axis 374 in the second spherical bearing 316'. As shown, the first end 354' of the body 352' and the first spherical bearing 314' have shifted in a first direction well the second end 358' and the second spherical bearing 316' have shifted in a second opposite direction. Also, both the first end 354' and the second end 358' have rotated about the bearing axes 372 and 374, respectively.

FIGS. 4E-4G are side views of the engine mounting link 312 (i.e., a view along the normal axes 376 and 378 discussed above with reference to FIG. 4A). FIG. 4E illustrates a first position of the body 352 of the engine mounting link 312 in solid line and a second position of the body 352' of the engine mounting link 312 (shown in broken line) after the engine mounting link 312 has rotated about the second spherical bearing 316. As shown, the first end 354' of the body 352' and the first spherical bearing 314' have shifted while the second end 358' and the second spherical bearing 316' have rotated about the normal axis 378 through the second bearing 316'. FIG. 4F illustrates the first position of the body 352 of the engine mounting link 312 in solid line and a second position of the body 352' of the engine mounting link 312 (shown in broken line) after the engine mounting link 312 has rotated about both the normal axis 376 through the first spherical bearing 314' and the normal axis 378 through the second spherical bearing 316'. As shown, the first end 354' of the body 352' and the first spherical bearing 314' have shifted in a first direction and the second end 358' and the second spherical bearing 316' have shifted in a second opposite direction. Also, both the first end 354' and the second end 358' have rotated about the normal axes 376' and 378', respectively. FIG. 4G illustrates the first position of the body 352 of the engine mounting link 312 in solid line and a second position of the body 352' of the engine mounting link 312 (shown in broken line) after the engine mounting link 312 has rotated about the first spherical bearing 314. As shown, the second end 358' of the body 352' and the second spherical bearing 316' have shifted while the first end 354' and the first spherical bearing 314' have rotated about the normal axis 376 through the first spherical bearing 314'.

FIG. 4H shows an end view of the engine mounting link 312 (i.e., a view along the longitudinal axis 370 discussed above with reference to FIG. 4A). FIG. 4G illustrates a first position of the body 352 of the engine mounting link 312 in solid line and a second position of the body 352' of the engine mounting link 312 (shown in broken line) after the engine mounting link 312 has been rotated about the longitudinal axis 370 through first spherical bearing 314 and the second spherical bearing 316.

FIGS. 4B-4H, discussed above, illustrate the engine mounting link 312 rotating about one axis or parallel axes at a time. In various instances, the engine mounting link 312 can rotate about multiple, perpendicular axes at the same time.

Movement of the engine mounting link 312 as described above with reference to FIGS. 4B-4G are generally governed by relative movement between a gas turbine engine (e.g., engine 104 in FIG. 2) and an engine mount structure (e.g., the yoke 302 and yoke arms 308 shown in FIG. 3). For example, the engine mounting link 312 may move as described in one or more of FIGS. 4B-4D upon the engine increasing in temperature and growing in diameter such that the locations of the engine mounting pins move. For example, with reference to FIG. 3 that shows two engine mounting pins 318, as the engine 104 connected to the yoke 302 by the engine mounting pins 318 increases in temperature, the engine 104 may grow in diameter. As a result, the engine mounting pins 318 may move farther apart. As a result, the engine mounting links 312 connecting the engine mounting pins 318 to the yoke 302 may rotate as shown in FIGS. 4B-4D to accommodate this thermal growth. As another example, the engine mounting link 312 may move as described in one or more of FIGS. 4E-4G as the engine increases or decreases in temperature and grows or shrinks in length such that the locations of the engine mounting pins 318 move forward or aft relative to the aft engine mount structure 212. For example, with reference to FIG. 3, the engine mounting pins 318 may move in the forward direction or the aft direction relative to the yoke 302 as the engine 104 temperature changes. As a result, the engine mounting links 312 connecting the engine mounting pins 318 to the yoke 302 may rotate as shown in FIGS. 4E-4G to accommodate this thermal growth.

The movement of the engine mounting link as shown in FIG. 4H is not governed by or constrained by relative motion between the engine 104 and the aft engine mount structure 212. Put differently, the engine mounting link 312 can rotate about its longitudinal axis 370 regardless of the relative position(s) between the engine 104 and the aft engine mount structure 212. As a result, the engine mounting link 312 can rotate about the longitudinal axis, as shown in FIG. 4H, freely. Such rotation about the longitudinal axis is only constrained by the engine mounting link 312 contacting other hardware, such as a turbine exhaust case of a gas turbine engine.

Figure 5A:
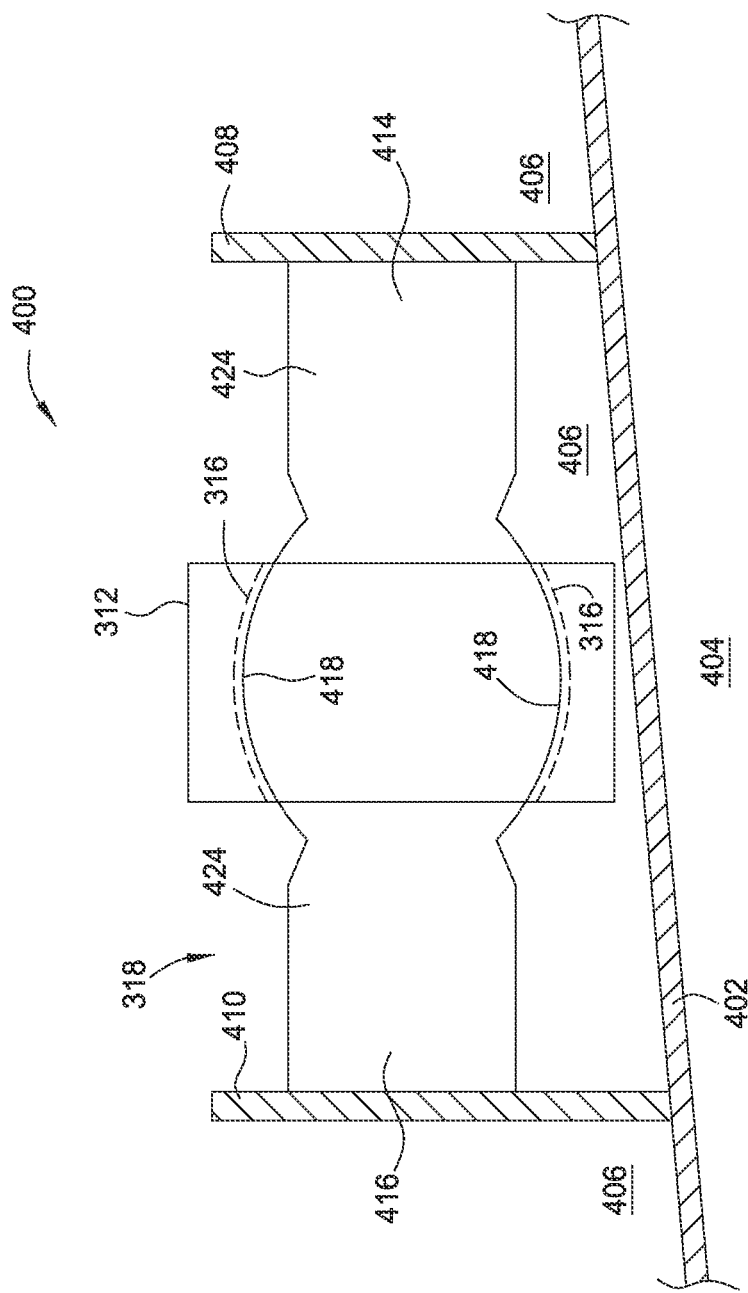
FIG. 5A is a schematic side view of part of an engine mounting arrangement that includes an engine mounting pin attached to and arranged between two flanges of a turbine exhaust case with an engine mounting link arranged on the engine mounting pin.

FIG. 5A is a partial cross-sectional side view of an engine mounting arrangement 400 for a gas turbine engine. A portion of a turbine exhaust case 402 is illustrated with a turbine environment 404 on one side of the turbine exhaust case 402 and an atmospheric environment 406 on an opposite side of the turbine exhaust case 402. In various instances, the turbine exhaust case could be heated to a temperature of several hundred degrees Fahrenheit and there could be a significant pressure differential from the turbine environment 404 to the atmospheric environment 406. Such extreme temperatures and pressures could make the turbine exhaust case 402 sensitive to nicks, scratches, dents, scuffing, or other surface damage that may degrade the strength of the turbine exhaust case 402. The turbine exhaust case 402 includes a first engine flange 408 and a second engine flange 410 extending from the turbine exhaust case on the atmospheric environment 406 side. The engine mounting pin 318 (e.g., the engine mounting pin 318 shown in FIG. 3) is arranged between and connected to the first engine flange 408 and the second engine flange 410. A first end 414 of the engine mounting pin 318 is attached to the first engine flange 408 and a second end 416 of the engine mounting pin 318 is attached to the second engine flange 410. The engine mounting pin 318 includes cylindrical surfaces 424 toward the first end 414 and the second end 416 and a spherical surface 418 therebetween. The spherical surface 418 engages a spherical bearing 316 in the engine mounting link 312.

Figure 5B:
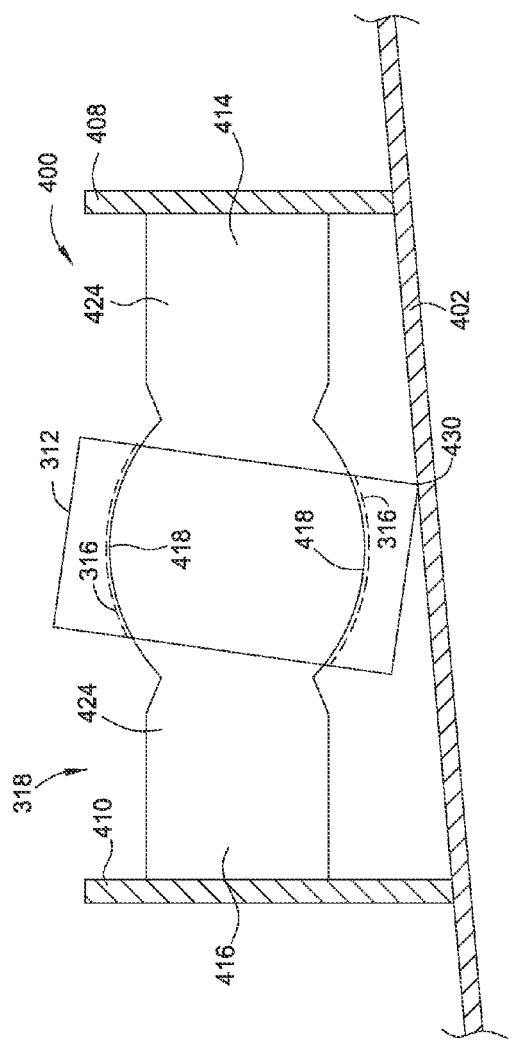
FIG. 5B is a schematic side view of the engine mounting arrangement of FIG. 5A with the engine mounting link rotated in a first direction about its longitudinal axis such that the engine mounting link contacts the turbine exhaust case.
Figure 5C:
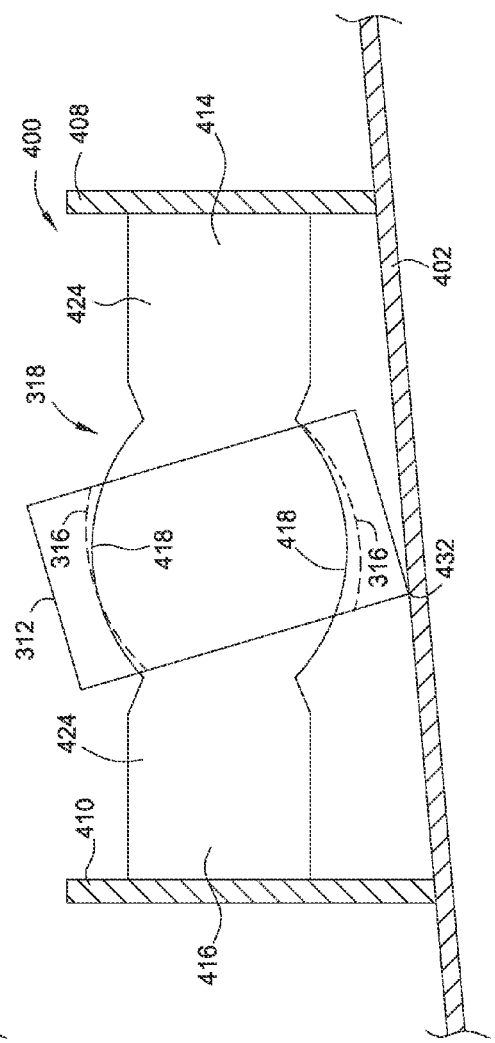
FIG. 5C is a schematic side view of the engine mounting arrangement of FIG. 5A with the engine mounting link rotated in a second direction opposite the first direction about its longitudinal axis such that the engine mounting link contacts the turbine exhaust case.

FIGS. 5B and 5C illustrate movement of the engine mounting link 312 relative to the engine mounting pin 318 and the turbine exhaust case 402 such that the engine mounting link 312 contacts the turbine exhaust case 402. FIG. 5B illustrates the engine mounting link 312 rotated about its longitudinal axis of the engine mounting link (e.g., the longitudinal axis 370 of the engine mounting link 312 illustrated in FIG. 4A) in a first direction such that the engine mounting link 312 contacts the turbine exhaust case 402 at a first location 430. FIG. 5C illustrates the engine mounting link 312 rotated about the longitudinal axis of the engine mounting link in a second direction (opposite the first direction) such that the engine mounting link 312 contacts the turbine exhaust case 402 at a second location 432. As discussed above, the engine mounting link 312 can freely rotate about its longitudinal axis until the engine mounting link 312 contacts the turbine exhaust case 402 at the first location 430 or at the second location 432. The turbine exhaust case 402 is often subject to significant vibration caused by operation of the gas turbine engine. Such vibration could cause repeated contact between the engine mounting link 312 and the turbine exhaust case 402. This repeated contact could damage and/or compromise the turbine exhaust case 402.

FIG. 6A illustrates an aspect of an aft engine mounting arrangement 600 in which stop collars 640 are placed over the engine mounting pins 318. A first engine mounting pin 318, which is visible in FIG. 6A, is connected at the first location 317 of the engine to the first engine flange 408 and the second engine flange 410 extending from the turbine exhaust case 402. A second engine mounting link (not visible in FIG. 6A, but see the second engine mounting pin 318 in FIG. 3) is connected at the second location 319 of the engine to the first engine flange 408 and the second engine flange 410. The first engine mounting pin 318 is connected to the yoke arm 308 of the yoke 302 by the engine mounting link 312. The stop collar 640 is arranged around the engine mounting pin 318 between the engine mounting link 312 and the first engine flange 408. Optionally, a second stop collar could be mounted around the engine mounting pin 318 between the engine mounting link 312 and the second engine flange 410.

FIG. 6B is a side view of the engine mounting pin 318, a portion of the engine mounting link 312, and the stop collar 640 arranged around the engine mounting pin 318. The engine mounting link 312 is illustrated rotated about its longitudinal axis (e.g., longitudinal axis 370 of the engine mounting link 312 illustrated in FIGS. 4A-4H) such that the engine mounting link 312 abuts the stop the collar 640. The stop collar 640 prevents further rotation of the engine mounting link 312 that could cause the engine mounting link 312 to contact the turbine exhaust case 402.

FIGS. 7A and 7B are a front perspective view and a rear perspective view, respectively, of the stop collar 640 (separate from the engine mounting pin 318). The stop collar 640 includes a cylindrical sleeve 646 with an interior surface 654 that defines an aperture 652 that extends from a first end 642 of the stop collar 640 to a second end 644. The first end 642 of the stop collar 640 is a substantially level surface that can abut the first engine flange 408 (or the second engine flange 410 of the turbine exhaust case 602. The second end 644 of the stop collar 640 includes an arcuate or a partial toroidal profile surface 648 in which the interior surface 654 gradually curves outward to an end point 650. As shown in FIG. 7B, the arcuate or partial toroidal profile surface 648 (i.e., outwardly-curved surface) can include a hollow backside 655.

Figure 7C:
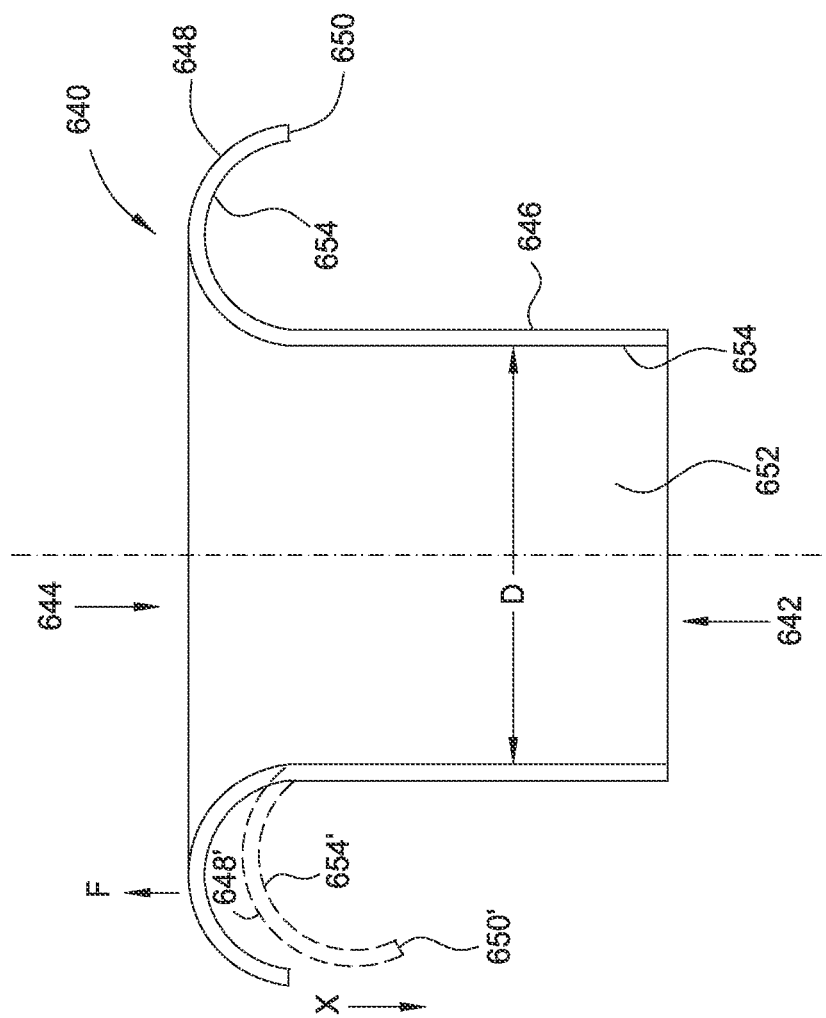
FIG. 7C is a cross-sectional side view of the stop collar of FIG. 6A.

FIG. 7C is a side cross-sectional view of the stop collar 640. The interior surface 654 defines an interior diameter D that is slightly larger than the diameter of the engine mounting pin 318. In various aspects, the stop collar 640 can translate along the engine mounting pin 318 (translation is limited by the engine flange and the engine mounting pin on opposing end of the stop collar 640) and can rotate about the engine mounting pin 318 relatively freely but with a minimum amount of slop movement. In various aspects, the interior diameter D of the stop collar 640 may be between 0.005 inches and 0.05 inches larger than a diameter of the engine mounting pin 318. In various aspects, the interior diameter D of the stop collar 640 is sufficiently larger than the diameter of the engine mounting pin 318 to accommodate different thermal expansion rates of the stop collar 640 and the engine mounting pin 318. For example, in certain aspects, the engine mounting pin 318 may expand to a greater extent than the stop collar 640 as temperatures climb. In such aspects, the interior diameter D of the stop collar 640 could be sized so that the interior diameter D is larger than the diameter of the engine mounting pin 318 at a particular operating temperature of the engine.

FIG. 7C also illustrates the arcuate or partial toroidal profile surface 648 acting as a spring that can apply a restoring force F to the engine mounting link 312 when the engine mounting link 312 contacts the stop collar 640. Referring again to FIG. 6B, when the engine mounting link 312 rotates about its longitudinal axis and contacts the stop collar 640, the partial toroidal profile surface 648 can deflect in the direction of arrow X (as illustrated by the partial toroidal profile surface 648' shown in broken line). Such displacement in the direction of arrow X results in a stress increase within the partial toroidal profile surface 648' and the body 646 that results in the restoring force F being transmitted to the engine mounting link 312. The increase of stress within the partial toroidal profile surface 648' and the body 646 acts as a spring such that larger displacements in the direction of arrow X results in larger restoring forces F. The restoring force F urges the engine mounting link 312 to return to a more centered position (e.g., the centered position of the engine mounting link 312 shown in FIG. 5A).

In various aspects, the stop collar 640 could be made from any number of metal alloys, such as a nickel alloy, INCONEL® alloys, WASPALOY® alloys, 300 series corrosion-resistant steel, or the like. In such aspects, the stop collar 640 could be formed from an extrusion process. In such aspects, the stop collar 640 could be formed as two halves that are welded or otherwise joined together. In various aspects in which the stop collar 640 is not subject to high temperatures, the stop collar 640 could be made from a plastic material, such as polyvinyl chloride (PVC), a nylon polymer, a plastic polymer, or the like. Such a plastic stop collar 640 could be formed through injection molding or the like. In various aspects, the material thickness of the body 646 (and the partial toroidal profile surface 648) of the stop collar 640 could be between 0.063 inches and 0.120 inches. In various aspects, a ratio of the diameter D of the stop collar 640 to the radius of curvature of the partial toroidal profile surface 648 could be between 1 and 20. In various aspects, a ratio of a wall thickness of the cylindrical sleeve 646 (and of the partial toroidal profile surface 648) over the radius of curvature of the partial toroidal profile surface 648 could be between 0.04 and 2.0. In various aspects, a ratio of a length of the stop collar 640 (from the first end 642 to the second end 644) over the radius of curvature of the partial toroidal profile surface 648 could be between 1.1 and 10.5.

Figure 8:
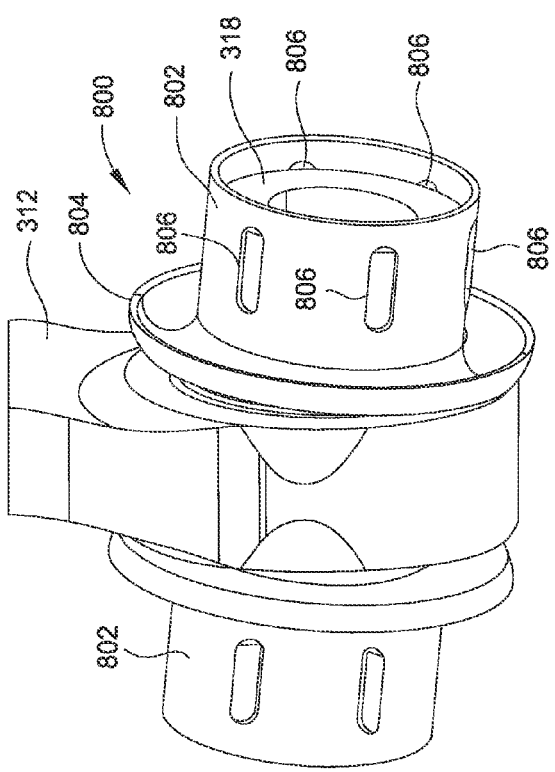
FIG. 8 is a perspective view of an engine mounting pin, engine mounting link, and stop collar according to at least one aspect.

FIG. 8 is a perspective view of a stop collar 800 according to at least one aspect that is arranged around an engine mounting pin 318 and next to an engine mounting link 312. FIG. 8 illustrates a first stop collar 800 arranged around the engine mounting pin 318 on a first side of the engine mounting link 312 and a second stop collar 800 arranged around the engine mounting pin 318 on a second side of the engine mounting link 312. The stop collar 800 includes a cylindrical sleeve 802 with an arcuate or a partial toroidal profile surface 804 arranged at an end of the cylindrical sleeve 802 and facing the engine mounting link 312. The cylindrical sleeve 802 includes one or more slots 806 arranged there through. The slots 806 enable maintenance personnel to rotate the stop collar 800 about the engine mounting pin 318 to visually inspect the engine mounting pin 318 for cracks or other damage.

Figure 9:
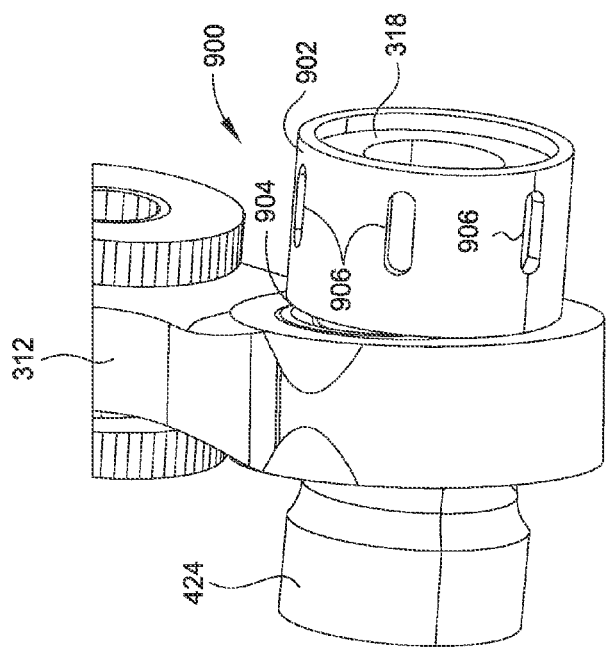
FIG. 9 is a perspective view of an engine mounting pin, engine mounting link, and stop collar according to at least one aspect.

FIG. 9 is a perspective view of the stop collar 900 according to at least one aspect that is arranged around an engine mounting pin 318 and next to an engine mounting link 312. The stop collar 900 includes a cylindrical sleeve 902 with flat ends. The engine mounting link 312 abuts one of the flat ends of the cylindrical sleeve 902 of the stop collar 900, and the abutment between the flat end and the engine mounting link 312 prevents excessive rotation of the engine mounting link 312. The cylindrical sleeve 902 includes one or more slots 906 arranged there through. The slots 906 enable maintenance personnel to rotate the stop collar 900 about the engine mounting pin 318 to visually inspect the engine mounting pin 318 for cracks or other damage.

In the various aspects described above, the stop collars can prevent the engine mounting links from rotating and/or moving in a manner that the links can contact a turbine exhaust case or other load. As discussed above, such contact could cause premature wear to the turbine exhaust case or other load. The addition of the stop collars around the load mounting pins could extend the life of the engine or other load. Although individual elements of the suspension system are described above with respect to a gas turbine engine, the suspension system could be used to support any load. For example, the yoke 302 or similar structure could extend from a support other than the engine mounting structure 208 and could support a load other than the gas turbine engine 104.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

While the foregoing is directed to certain aspects, other and further aspects may be devised without departing from the basic scope thereof, and the scope thereof is determined by the claims that follow.

What is claimed is:

1. An aircraft, comprising:
   a wing that includes an engine mounting structure;
   a yoke extending from the engine mounting structure, wherein the yoke includes a yoke pin;
   an engine, wherein the engine includes an engine mounting pin comprising a cylindrical surface;
   an engine mounting link connected to the yoke pin by a first spherical bearing and connected to the engine mounting pin by a second spherical bearing, wherein the engine mounting link can pivot about the first spherical bearing and the second spherical bearing to allow relative motion between the engine mounting pin and the yoke pin; and
   a stop collar arranged around the engine mounting pin, wherein the stop collar comprises a cylindrical sleeve that fits around the cylindrical surface, and an outwardly-curved surface having a partial toroidal profile extending from an end of the cylindrical sleeve, the outwardly-curved surface arranged toward the engine mounting link, wherein the stop collar is adapted to contact the engine mounting link to limit rotation of the engine mounting link about a longitudinal axis through the first spherical bearing and the second spherical bearing.

2. The aircraft of claim 1, wherein the engine mounting pin is connected to the engine between a first engine flange and a second engine flange, and wherein the stop collar is arranged around the engine mounting pin between the first engine flange and the engine mounting link.

3. The aircraft of claim 2, further comprising a second stop collar arranged around the engine mounting pin between the second engine flange and the engine mounting link.

4. The aircraft of claim 1, wherein the cylindrical sleeve includes at least one slot therethrough.

5. The aircraft of claim 1, wherein the stop collar comprises one of: a nickel alloy, an Inconel alloy, a Waspaloy alloy, and corrosion-resistant steel.

6. The aircraft of claim 1, wherein the engine mounting pin is arranged on the engine at a first location, wherein the aircraft further comprises an engine mount rigidly coupling the engine to the wing at a second location on the engine, and wherein the relative motion between the engine mounting pin and the yoke comprises thermal expansion of the engine between the first and second locations.

7. The aircraft of claim 1, further comprising:
   a second yoke pin;
   a second engine mounting pin;
   a second engine mounting link connected to the second yoke pin by a third spherical bearing and connected to the second engine mounting pin by a fourth spherical bearing, wherein the second engine mounting link can pivot about the third spherical bearing and the fourth spherical bearing to allow relative motion between the second engine mounting pin and the yoke pin; and
   a second stop collar arranged around the second engine mounting pin, wherein the second stop collar is adapted to contact the second engine mounting link to limit rotation of the second engine mounting link about a longitudinal axis through the third spherical bearing and the fourth spherical bearing.

8. The aircraft of claim 1, wherein the stop collar does not limit rotation of the engine mounting link about axes perpendicular to the longitudinal axis.

9. A suspension system for suspending a load, the suspension system comprising:
   a yoke adapted to extend from a support, wherein the yoke includes a yoke pin;

a load mounting pin adapted to carry the load, the load mounting pin comprising a cylindrical surface;

a mounting link connected to the yoke pin by a first spherical bearing and connected to the load mounting pin by a second spherical bearing, wherein the mounting link can pivot about the first spherical bearing and the second spherical bearing to allow relative motion between the load mounting pin and the yoke; and a stop collar arranged around the load mounting pin, wherein the stop collar comprises a cylindrical sleeve that fits around the cylindrical surface, and an outwardly-curved surface having a partial toroidal profile extending from an end of the cylindrical sleeve, the outwardly-curved surface arranged toward the mounting link, wherein the stop collar is adapted to contact the mounting link to limit rotation of the mounting link about a longitudinal axis through the first spherical bearing and the second spherical bearing.

10. The suspension system of claim 9, wherein the load mounting pin is connected to the load between a first flange of the load and a second flange of the load, and wherein the stop collar is arranged around the load mounting pin between the first flange of the load and the mounting link.

11. The suspension system of claim 10, further comprising a second stop collar arranged around the load mounting pin between the second flange of the load and the mounting link.

12. The suspension system of claim 9, wherein the stop collar comprises one of: a nickel alloy, an Inconel alloy, a Waspaloy alloy, corrosion-resistant steel, a polyvinyl chloride (PVC) plastic polymer, and a nylon polymer.

13. A method for mounting a load from a support, the method comprising:

attaching a yoke to the support, wherein the yoke includes a yoke pin;

arranging the load relative to the yoke;

arranging a mounting link between the yoke and the load, wherein the mounting link includes a first spherical bearing arranged at a first end and a second spherical bearing arranged at a second end;

coupling the mounting link to the yoke by attaching the yoke pin to the yoke and to the first spherical bearing;

arranging a stop collar around a load mounting pin having a cylindrical surface, wherein the stop collar comprises a cylindrical sleeve that fits around the cylindrical surface, and an outwardly-curved surface having a partial toroidal profile extending from an end of the cylindrical sleeve, the outwardly-curved surface arranged toward the mounting link; and coupling the mounting link to the load by attaching the load mounting pin to the load and to the second spherical bearing, wherein the mounting link can pivot about the first spherical bearing and the second spherical bearing to allow relative motion between the load mounting pin and the yoke, and wherein the stop collar is adapted to contact the mounting link to limit rotation of the mounting link about a longitudinal axis through the first spherical bearing and the second spherical bearing.

14. The method of claim 13, wherein attaching the load mounting pin to the load comprises connecting the load mounting pin to a first flange of the load and a second flange of the load, and wherein arranging the stop collar around the load mounting pin comprises arranging the stop collar on the load mounting pin between the mounting link and the first flange of the load.

15. The method of claim 14, further comprising arranging a second stop collar around the load mounting pin between the mounting link and the second flange of the load.

16. The method of claim 13, further comprising:

arranging a second mounting link between the yoke and the load, wherein the second mounting link includes a third spherical bearing arranged at a third end and a fourth spherical bearing arranged at a fourth end;

coupling the second mounting link to the yoke by attaching a second yoke pin to the yoke and to the third spherical bearing;

arranging a second stop collar around a second load mounting pin; and coupling the second mounting link to the load by attaching the second load mounting pin to the load and to the fourth spherical bearing, wherein the second mounting link can pivot about the third spherical bearing and the fourth spherical bearing to allow relative motion between the second load mounting pin and the yoke, and wherein the second stop collar is adapted to contact the second mounting link to limit rotation of the second mounting link about a longitudinal axis through the third spherical bearing and the fourth spherical bearing.

\* \* \* \* \*